United States Patent Office 3,438,877
Patented Apr. 15, 1969

3,438,877
ELECTROLYTIC REDUCTIVE COUPLING OF AZO COMPOUNDS
Manuel M. Baizer, St. Louis, Mo., assignor to Monsanto Company, St. Louis, Mo., a corporation of Delaware
No Drawing. Filed May 18, 1966, Ser. No. 550,941
Int. Cl. B01k 1/00
U.S. Cl. 204—73    12 Claims The present invention relates to the electrolytic recoupling of azo compounds with activated olefines.

The process of the present invention is illustrated: in which R and R' are monovalent moieties and X is an activating group. The illustrated product may undergo intramolecular ring formation or other reactions, depending upon its propensities as determined by the particular functional and other groups it contains.

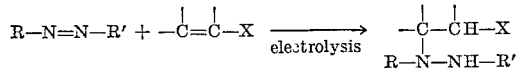

The present process involves electrolysis of electroreducible azo compounds and olefinic compounds in solutions of supporting electrolyte salts. The supporting electrolyte salts are less subject to reduction at the cathode than the azo compound being electrolyzed. It is preferred to utilize azo compounds which do not require extremely neagtive voltages, particularly no less negative than —2.0 cathode volts, the cathode volts being vs. a saturated calomel electrode as measured under the electrolysis conditions. Azo compounds containing electron-withdrawing groups on one or both nitrogen atoms tend to be fairly readily reducible and can suitably be employed, the electron-withdrawing groups being, for example, carboxyl, cyano, carboxamido, phosphonato, phosphinato, sulfonyl, o- or p-pyridyl, etc. Aryl groups, such as phenyl and naphthyl groups are also suitable, and such groups can have various substituents, being strictly hydrocarbon as with alkyl substituents, or having various other substituents such as halogens, alkoxy groups, hydroxyl, amino groups, cyano groups, etc., the azo compounds having aryl groups on each nitrogen being designated as azoarenes. The presence of certain substituents on the aryl ring in ortho- or para-position to the nitrogen is actually beneficial in making the azo compound double bond reducible at less negative voltages, such groups being electron-withdrawing groups which are classified as meta-directing groups, e.g. cyano groups, acyl groups, carboxylato groups, etc. In general it is preferred that any substituents not be reducible at less negative voltages than the azomethine double bond, as the more readily reducible group would then be reduced before the desired coupling occurred. However, a reduced, coupled product would still be obtained in accordance with the present invention even though the readily reducible group had also been reduced. The foregoing substituents can be employed on both nitrogen atoms, either alone or in various combinations, or can be employed in combination with groups which do not aid reducibility, such as alkyl groups, in azo compounds sufficiently reducible to be reductively coupled in accordance with the present invention. Any of the foregoing groups can be utilized as R or R' in the illustrative reaction hereinabove. Further specific examples of azo compounds suitable for reductive coupling in accordance with the procedure of the present invention include:

$C_6H_5-N=N-C_6H_5$ $C_6H_5-N=N-\text{m-tolyl}$ $C_6H_5-N=N-CO_2C_2H_5$ $$C_6H_5-N=N-\overset{O}{\underset{\parallel}{C}}-N(C_2H_5)_2$$

The foregoing azo compounds can be reductively coupled with activated olefins, exemplified, for example, by acrylonitrile or ethyl acrylate. The activated olefins employed are hydrodimerizable olefins, being those which have the olefinic group in α,β-position with respect to electron-withdrawing groups, such as carboxyl, cyano, carboxamido, phosphonato, phosphinato, sulfonyl, o- or p-pyridyl, etc. groups; any of the foregoing groups can be employed as X in the illustrative reaction hereinabove. In general such olefins will conform to the formula $$R-CH=CH-X$$

in which X can be any of the foregoing activating groups, and R is hydrogen or an alkyl group, especially lower alkyl groups of up to 6 carbon atoms. Derivatives of acrylic acid, e.g. acrylic esters, acrylamides and acrylonitrile, are particularly useful, as are other activated olefins containing the vinyl, $CH_2=CH-$, group. The electrolytic reductive couplings in accordance with the present invention will generally occur most efficiently when the azo compound is more readily reduced than the olefinic compound and serves as a donor molecule, while the olefin serves as the acceptor molecule. Such reaction can be pictured as involving the uptake of two electrons by a nitrogen atom of the azo compound, which then joins with the acceptor molecule at the β-carbon thereof. The coupled compound is then protonated by water or some other proton source. It will be realized that the mechanism may not in all cases involve addition of two electrons, and that protonation can occur at intermediate stages. Moreover, the reaction is not to be considered as limited to any particular mechanism. In general the olefinic compounds employed as in the present process will have reduction potentials of —1.6 volts to —2.0 volts vs. saturated calomel electrode. Those compounds particularly useful as acceptors in the generalized Michael condensation will be suitable for use as acceptors in the present process.

It will be realized that the cross-coupling reactions will be accompanied by varying amount of hydrodimerization product of the olefinic reactant depending upon the particular reactants involved and the conditions of electrolysis. The concomitant production of hydrodimerization products may be desirable as such products may be very useful. However, it will often be desired to direct the process toward preferential production of the coupled product. This can be done by regulating the cell voltage so that the electrolysis occurs at a cathode potential close to that for reduction of the monomer requiring the lowest voltage, i.e. the least negative voltage. This is particularly effective if the voltage for the more readily reducible monomer is appreciably lower than that for the other monomer, for example, 0.3 volt or more below that for the other monomer. In such cases, if the electrolysis is conducted at a cathode potential just sufficiently higher than that required for the more easily reducible monomer to achieve a practical reaction rate, there will be little if any hydrodimerization of the olefin if it is the more difficulty reducible monomer, and the products are those resulting from coupling of the two monomers. It is also possible to minimize the hydrodimerization of the olefinic monomer by "swamping" the mixture with the other monomer, employing only enough of the olefinic monomer to provide monomer as needed for coupling. If the olefinic monomer is subject to hydrodimerization at the cathode potential employed it may be desirable to utilize small amounts of the olefinic monomer and continuously or incrementally add such monomer as it is used up. Further description of conditions for cross-couplings which are applicable here appear in my Patent 3,193,476 issued July 6, 1965.

The concentration of the components in the electrolysis medium can vary considerably, but there will generally be at least 5% by weight of the azo compound and at least 5% by weight of the olefin. A supporting electrolyte will generally constitute at least 5% by weight of the electrolysis medium and frequently up to 20 or 30% by weight or more. The olefin compound can be employed in large amounts and can often serve as solvent as well as reactant in the electrolysis; it is frequently preferred to employ high concentrations of the olefin in order to have it present to react with the intermediate resulting from addition of electrons to the azo compound, for example having 5 mols or more of olefin present for each mol of azo compound, and up to 50 mols or more of olefin on such basis can be employed. However, it is also feasible to employ equimolar amounts or to employ the azo compound in excess. Water or other polar solvents can also be present. Water serves as a proton source for saturation of the intermediates obtained upon coupling the reactant molecules, but acetonitrile or other solvents can serve this purpose. If water is employed, its concentration can vary widely, but because of possible hydrolysis and similar reactions, it is frequently desirable to keep water in the range of up to 10% or so by weight of the electrolysis medium, although much higher amounts can be employed. Water increases conductivity and its presence is at times advantageous in avoiding or minimizing side reactions. Various other solvents, for example dimethylformamide, can also be present.

In general any cathode and anode materials can be employed in the electrolysis cell employed for the present invention. As the reduction occurs at the cathode, the anode material actually has little influence on the reaction. For the cathode it is preferred to use a material having a hydrogen overvoltage greater than that of copper, such materials as lead and mercury being particularly suitable. However stainless steel or materials of low hydrogen overvoltage such as platinum can be employed. The electrolysis is preferably conducted in a divided cell in order to minimize undesirable reactions possibly occurring at the anode, but an undivided cell can be employed. A porous diaphragm is useful as a cell divider, the types used in electrolysis cells being generally known. Ion exchange membranes are especially suitable for such purpose, particularly those selective for cations and referred to as cationic perm-selective membranes.

During electrolysis in a divided cell, alkalinity increases in the catholyte. However the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte may thus be realized by purposely leaking acid from the anolyte into the catholyte. It can also be achieved by extraneous addition to the catholyte of an acid material, e.g. glacial acetic acid, phosphoric acid, sulfuric acid etc. It is generally preferable to utilize mildly alkaline conditions for the electrolysis, e.g. from about pH 7 to pH 9.5, in order to minimize side reactions, such as hydrolysis of ester groups or other groups, cyanoethylation reactions if acrylonitrile is present, etc. Acid conditions can also produce side reactions resulting from protonation of intermediates, as well as a tendency to polymerization in some instances. However pH's of 5 or 6 will generally be suitable, and lower pH's can also be employed. It will be recognized that the pH may have limited significance when anhydrous systems or those having very small amounts of water are under consideration and moreover that small amounts of acid may serve as a useful source of protons for completing the reduction of the coupled product. If desired, polymerization inhibitors such as hydroquinone or p-nitrosodimethylaniline can be included in the electrolysis medium. Further description of electrolytes, electrolysis cells and other factors pertinent to the present invention are set forth in my Patent No. 3,193,476.

As supporting electrolyte salts in the present invention it is generally desirable to employ salts having cations (and anions) which discharge at cathode voltages substantially more negative than that at which the electrolysis occurs, the quaternary ammonium cation being particularly suitable in this regard. In general the process is operative so long as the required cathode potential is attained, regardless of what salts are employed as electrolyte. The alkali metal ions, for example, discharge more readily, i.e. at less negative cathode potentials, than quaternary ammonium metal ions, therefore are not particularly recommended for use, but can nevertheless be employed when the azo compound discharges at the same, or preferably, substantially less negative potentials.

Among the salts which can be employed as supporting electrolytes in the present process, the amine and quaternary ammonium salts are generally suitable, especially those of sulfonic and alkyl sulfuric acids. Such salts can be the saturated aliphatic amine salts or heterocyclic amine salts, e.g. the mono-, di- or trialkylamine salts, or the mono-, di- or trialkanolamine salts, or the piperidine, pyrrolidine or morpholine salts, e.g. the ethylamine, dimethylamine or triisopropylamine salts of various acids, especially various sulfonic acids. Especially preferred are aliphatic and heterocyclic quaternary ammonium salts, i.e. the tetraalkylammonium or the tetraalkanolammonium salts or mixed alkyl alkanol ammonium salts such as the alkyltrialkanolammonium, the dialkyldialkanolammonium, the alkanoltrialkylammonium or the N-heterocyclic N-alkyl ammonium salts of sulfonic or other suitable acids. Further specific examples of suitable amine and ammonium cations will be given below in setting forth specific salts suitable for use in the present invention. The saturated aliphatic or heterocyclic quaternary ammonium cations in general have suitably high cathode discharge potentials for use in the present invention and readily form salts having suitably high water solubility with anions suitable for use in the electrolytes employed in the present invention. The saturated aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed; (as also can aryl sulfonate anions).

Among the anions useful in the electrolytes employed in the present process, the aryl and alkaryl sulfonic acids are especially suitable, for example, salts of the following acids: benzenesulfonic acid, o-, m- or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4- or 5-sulfonic acid, mesitylene-2-sulfonic acid, durene-3-sulfonic acid, pentamethylbenzenesulfonic acid, o-dipropylbenzene-4-sulfonic acid, alpha- or beta-naphthalenesulfonic acid, o-, m- or p-biphenylsulfonic acid, and alpha-methyl-beta-naphthalenesulfonic acid. As explained heretofore, alkali metal salts are useful in the present invention with certain limitations and the alkali metal salts of such sulfonic acids can be employed, i.e. the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate, or potassium pentamethylbenzenesulfonate. The salts of such sulfonic acids may also be the saturated, aliphatic amine or heterocyclic amine salts, e.g. the mono-, di- or trialkylamine salts, or the mono-, di- or trialkanolamine salts, or the piperidine, pyrrolidine, or morpholine salts, e.g. the ethylamine, dimethylamine or triisopropylamine salt of benzensulfonic acid or of o-, p- or m-toluenesulfonic acid; the isopropanolamine, dibutanolamine or triethanolamine salt of o-, p- or m-toluenesulfonic acid or of o-, p- or m-biphenylsulfonic acid; the piperidine salt of alpha- or beta-naphthalenesulfonic acid or of the cumenesulfonic acids; the pyrrolidine salt of o-, m- or p-amylbenzenesulfonate; the morpholine salt of benzenesulfonic acid, of o-, m- or p-toluenesulfonic acid, or of alpha- or beta-naphthalenesulfonic acid, etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g. tetraethylammonium o- or m-toluenesulfonate or benzenesulfonate; tetraethylammonium o-, m- or p-cumenesulfonate or o-, m- or p-ethylbenzenesulfonate, tetramethylammonium benzenesulfonate, or o-, m- or p-toluenesulfonate; N,N-di-methylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalenesulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate or o-, m- or p-hexylbenzenesulfonate, tetrapentanolammonium p-cymene-3-sulfonate or benzenesulfonate; methyltriethylammonium o-, m- or p-toluenesulfonate or mesitylene-2-sulfonate; trimethylethylammonium o- xylene-4-sulfonate or o-, m- or p-toluenesulfonate; triethylpentylammonium alpha or beta-naphthalenesulfonate or o-, m- or p-butylbenzenesulfonate, trimethylethanolammonium benzenesulfonate or o-, m- or p-toluenesulfonate; N,N-di-ethyl-piperidinium or N-methyl-pyrrolidinium o-, m- p-hexylbenzenesulfonate or o-, m- p-toluenesulfonate, N,N-di-isopropyl or N,N-di-butylmorpholinium o-, m- or p-toluenesulfonate or o-, m- or p-biphenylsulfonate, etc.

Another especially suitable class of salts for use in the present invention are the alkylsulfate salts such as methosulfate salts, particularly the amine and quaternary ammonium methosulfate salts. Methosulfate salts such as the methyltriethylammonium, tri-n-propylmethylammonium, triamylmethylammonium, tri-n-butylmethylammonium, etc., are very hygroscopic, and the tri-n-butylmethylammonium in particular forms very concentrated aqueous solutions which dissolve large amounts of organic materials. In general the amine and ammonium cations suitable for use in the alkylsulfate salts are the same as those for the sulfonates. Various other quaternary ammonium salts can be employed as supporting electrolyte, e.g. the halides, sulfates, phosphates, acetates and other carboxylic acid salts, benzoates, phosphonates, etc., specifically for example, tetramethylammonium bromide, tetraethylammonium bromide, tetramethylammonium chloride, tetraalkyl phosphonium chloride, tetraethylammonium phosphate, etc.; and similarly the alkali, alkaline earth and other metal salts with the foregoing anions can be employed, e.g. sodium chloride, potassium phosphates, sodium acetate, calcium acetate, lithium benzoate, calcium chloride, rubidium bromide, magnesium chloride as well as the sulfonic acid, particularly aromatic sulfonic acid, and alkylsulfuric acid salts of the foregoing cations and of other alkali, alkaline earth, rare earth and other metals, e.g. cesium, cerium, lanthanum, yttrium, particularly with anions to achieve sufficient water solubility. The aluminum cation is only somewhat inferior to sodium in respect to its discharge potential, but most salts of aluminum tend to hydrolyze in water and precipitate aluminum oxide. It is understood that the solutions designated herein as containing salts, electrolytes, etc., in specified amounts have reference to solutions containing salts sufficiently stable to remain in solution. It will be recognized that many cations are capable of existing in several valence states, and some valence states will be more suitable as supporting electrolytes than others. Other examples of salts which can be employed in the present process, although not necessarily with equivalent or optimum results, are barium bromide, barium acetate, barium propionate, barium adipate, cerium sulfate, cesium chloride, cesium benzoate, cesium benzene sulfonate, potassium oxalate, potassium sulfate, potassium ethyl sulfate, lanthanum acetate, lanthanium benzene sulfonate, sodium sulfate, sodium potassium sulfate, strontium acetate, rubidium sulfate, rubidium benzoate, trisodium phosphate, sodium hydrogen phosphate and sodium bicarbonate.

EXAMPLE 1

A catholyte was prepared containing 25 grams azobenzene, 40 grams methyltriethylammonium p-toluenesulfonate, 3 grams water and 110 ml. acrylonitrile containing a trace of p-nitrosodimethylaniline polymerization stabilizer. The cell was a glass receptacle containing 110 ml. mercury as cathode (about 55 sq. centimeter cathode). An Alundum cup was suspended to its top edge in the catholyte and provided with a concentrated aqueous solution of the methyltriethylammonium p-toluenesulfonate salt in water as anolyte, the cup serving as a divider to divide the anolyte from the catholyte, and a platinum anode was immersed in the anolyte. Electrolysis was conducted utilizing direct current with a cell voltage of about 30 to 40 volts at cathode voltage of —0.8 to —1.0 volts (vs saturated calomel electrode). A total of 6.3 ampere-hours was utilized, the current varying from about 2.5 to 1.5 amperes during the electrolysis. An additional 2 ml. of water was added to the catholyte about midway in the electrolysis. The cathode voltage had suddenly changed to —1.8 volts immediately before the electrolysis was discontinued. The catholyte was extracted with methylene dichloride and the extract washed with water and then methylene chloride and acrylonitrile were removed over a water bath with vacuum to leave a 27.4 gram residue. The residue was dissolved in 200 ml. methylene chloride, filtered and passed through an activated alumina column, 75 ml. fractions of methylene chloride solutions being collected. From the second fraction, 2.5 grams of orange solid was isolated and recrystallized from alcohol to obtain a white solid, N-β-cyanoethylhydrazobenzene, M.P. 129° C.

*Analysis.*—Calc'd. forr $C_{15}H_{15}N_3$: C, 75.91; H, 6.37; N, 17.71. Found: C, 75.60; H, 6.45; N, 17.54.

EXAMPLE 2

The general procedure and electrolysis cell were the same as in Example 1. The catholyte contained 40 grams of tetraethylammonium p-toluenesulfonate, 25 grams azobenzene, 100 ml. ethyl acrylate containing a trace of hydroquinone as stabilizer and 60 ml. acetonitrile. The anolyte was a concentrated aqueous solution of methyltriethylammonium p-toluenesulfonate. The electrolysis was conducted at current of 1 to 1.5 amperes and circa —1.0 cathode volts (vs, saturated calomel electrode) for a total of 7.06 ampere-hours. During the electrolysis, 4 ml. of additional water was added to the catholyte. The catholyte was extracted with methylene chloride and 25.7 grams of material was present after volatile materials were removed from the extracts. The material was treated with methanol, filtered and washed with methanol to obtain off-white crystals, M.P. 131–132° C., identified by mixed melting point as hydrazobenzene. The volatile solvent was removed from the filtrate and the residue dissolved in 150 ml. methylene chloride and passed through an activated alumina column, collecting 75 ml. effluents. The second and third fractions were evaporated to an orange syrup, which was taken up in diethyl ether and permitted to slowly crystallize, treated with methanol, filtered and washed with methanol to provide 2 grams of white crystals, M.P. 135° C. Recrystallization from ethanol gave a melting point of 135–136° C. The analysis and infra red spectrum were consistent with that for 1,2-diphenyl-3-oxopyrazolidine, indicating that the intermediate N-β-carbethoxyethylhydrazobenzene had cyclized with elimination of ethanol.

*Analysis.*—Calc'd. for $C_{15}H_{14}N_2O$: C, 75.60; H, 5.92; N, 11.76. Found: C, 75.46; H, 6.40; N, 12.16.

The fourth through the ninth fractions of effluent collected from the alumina column in the above-described procedure were evaporated to give small amounts of yellow solid which were combined in diethyl ether, from which 31 grams of crystals were deposited. The crystals were separated by filtration, washed with methanol, and recrystallized from ethyl alcohol, M.P. 130° C. The elemental analysis indicated the product to be N,N'-bis(β-carbethoxyethyl)hydrazobenzene, resulting from reductive coupling of an ethyl acrylate molecule at each nitrogen of the azobenzene.

What is claimed is:

1. The method of electrolytic reductive coupling which comprises electrolyzing a solution of an azo compound in which the azo group is electroreducible and an olefin selected from the group consisting of α,β-olefinic esters, nitriles, carboxamides, phosphonates, phosphinates and sulfones, 2-alk-1-enyl pyridines, and 4-alk-1-enyl pyridines, the said solution containing a supporting electrolyte and the electrolysis of the solution occurring in contact with a cathode, and attaining a cathode potential sufficient to effect the reductive coupling, and recovering a reduced, coupled product in which coupling has occurred between the β-carbon of the olefin and nitrogen of the azo compound.

2. The method of claim 1 in which a quaternary ammonium salt is present, and the azo compound is subject to reduction at a cathode potential less negative than −2.0 volts.

3. The method of claim 1 in which the substituents on both nitrogen atoms of the azo compound are aryl and the azo compound reduces at a cathode potential less negative than that at which the olefin reduces.

4. The method of claim 1 in which azobenzene is reductively coupled.

5. The method of claim 1 in which acrylonitrile is reductively coupled.

6. The method of claim 1 in which a lower alkyl acrylate is reductively coupled.

7. The method of claim 1 in which the azo compound reduces at a cathode potential less negative than −1.6 volts and the olefin reduces at a potential at least 0.3 volt more negative than that at which the azo compound reduces and in the range of −1.6 to −2.0 volts.

8. The method of claim 7 in which a lower alkyl acrylate is reductively coupled with an azoarene and the product recovered is a 1,2-diaryl-3-oxopyrazolidine.

9. The method of claim 7 in which acrylonitrile is reductively coupled with an azoarene to obtain an N-β-cyanoethylhydrazoarene.

10. The method of claim 7 in which ethyl acrylate is reductively coupled with azobenzene to obtain 1,2-diphenyl-3-oxopyrazolidine.

11. The method of claim 7 in which acrylonitrile is reductively coupled with azobenzene to obtain N-β-cyanoethylhydrazobenzene.

12. The method of claim 7 in which the pH is maintained in the range of about 7 to about 9.5 and a quaternary ammonium salt is employed as supporting electrolyte, and the olefin, the azo compound, and the supporting electrolyte each constitute at least 5% by weight of the said solution.

References Cited

UNITED STATES PATENTS

| | | | |
|---|---|---|---|
| 1,225,052 | 5/1917 | Piguet | 204—74 |
| 1,998,488 | 4/1935 | Penns Grove et al. | 260—569 |
| 3,193,479 | 7/1965 | Baizer | 204—73 |
| 3,250,690 | 5/1966 | Baizer | 204—73 |

JOHN H. MACK, *Primary Examiner.*

HOWARD M. FLOURNOY, *Assistant Examiner.*

U.S. Cl. X.R.

204—59, 74